United States Patent
Gibbons

[11] Patent Number: 6,116,622
[45] Date of Patent: Sep. 12, 2000

[54] STEERABLE AND BRAKABLE SLED

[76] Inventor: Robert R. Gibbons, 3842 Rence Dr., Bismarck, N. Dak. 58501

[21] Appl. No.: 08/880,706

[22] Filed: Jun. 23, 1997

[51] Int. Cl.[7] .................................................. B62B 13/00
[52] U.S. Cl. ........................ 280/16; 280/14.3; 280/28.11; 280/22.1
[58] Field of Search ............................. 280/28.11, 21.1, 280/22, 17, 16, 22.1, 14.1, 14.3, 18, 15, 28.12

[56] References Cited

U.S. PATENT DOCUMENTS

| | | | |
|---|---|---|---|
| 3,528,674 | 9/1970 | Schwarz | 280/21.1 |
| 3,746,357 | 7/1973 | Haskins | 280/15 |
| 3,788,661 | 1/1974 | Hird | 280/22 |
| 3,815,696 | 6/1974 | Larive et al. | 280/21.1 |
| 3,827,516 | 8/1974 | Lucia | 280/16 |
| 3,847,239 | 11/1974 | Copeland | 280/21.1 |
| 3,948,536 | 4/1976 | Konrad | 280/18 |
| 4,036,506 | 7/1977 | Scheib | 280/21.1 |
| 4,141,566 | 2/1979 | Benes . | |
| 4,285,529 | 8/1981 | Vaillancourt . | |
| 4,291,891 | 9/1981 | Blanchette . | |
| 5,344,167 | 9/1994 | Strouth | 280/14.1 |
| 5,573,257 | 11/1996 | Olivieri | 280/21.1 |
| 5,667,229 | 9/1997 | Wenger | 280/28.11 |

Primary Examiner—Peter C. English
Assistant Examiner—Lynda Jasmin
Attorney, Agent, or Firm—David A. Lingbeck

[57] ABSTRACT

A steerable and brakable sled comprises a body member having a passenger compartment and being mounted to a frame and upon a pair of skis each having a duckbill-shaped forward portion, and further comprises steering and braking controls, the steering controls including a steering member, a pair of steering arms connected to the skis for pivoting the skis on their edges which turn the sled in the desired direction, and the braking control including a braking arm connected to the steering member which is accessibly disposed inside the passenger compartment and connected to a plate-like braking member hingedly attached to the bottom side of the body member at the rear end thereof and having a corrugated edge for engaging the ground once the user pulls back on the steering member.

5 Claims, 5 Drawing Sheets

STEERABLE AND BRAKABLE SLED

BACKGROUND OF THE INVENTION

This invention relates to a steerable and brakable sled for transportation especially on land.

Sleds were one of the first vehicles ever made for transportation especially on snow or ice covered land even before wheeled vehicles such as horse drawn carriages were made. Such sleds have the conventional long, skinny runners which essentially slide upon the land as the sled moves by itself down a grade of land or is pulled by a motorized vehicle or a horse.

One known prior art is a WHEELCHAIR SUPPORTING SLED, U.S. Pat. No. 4,141,566, issued on Feb. 27, 1979 and invented by David M. Benes, which comprises a pair of support members, a pair of runners, a frame mounted upon the runners, a steering runner, a pair of outriggers for steering the sled, and a wheelchair supported by the support members.

Another known prior art is a CONVERTIBLE SLED, U.S. Pat. No. 4,291,891, issued on September 1981 and invented by Claude Blanchette, which comprises an elongated seat, two supports, a pair of laterally spaced runners, plate extending from the front of the seat, a plurality of rods upon which wheels are rotatably mounted for converting the sled into a wheeled vehicle.

Another known prior art is a SLED WITH OCCUPANT PROTECTION, U.S. Pat. No. 4,285,529, issued on Aug. 25, 1981 and invented by Ellen M. Vaillancourt, which comprises a frame, a pair of sled runners, and a passenger or cargo receiving enclosure mounted upon the runners.

None of the prior art describes a sled having a steering means where the skis have a duckbill forward portion which have curved edges and are pivoted on either of their edges to turn the sled either right or left or a braking means where an elongate member having a tooth or corrugated edge engages the surface to stop the sled, all of which are features of the present invention.

SUMMARY OF THE INVENTION

The present invention relates to a steerable and brakable sled which comprises a body member having a passenger compartment; a frame to which the body member is fixedly attached; a pair of skis to either side of the body member and upon which the body member and the frame are mounted; a steering means including a steering member for pivoting the skis and steering the sled; and a braking means for slowing and stopping the sled. To turn the sled either to the right or to the left, the user turns or rotates the steering member in the direction of the desired turn. To slow or stop the sled, the user urges the steering member back towards the rear of the sled.

One objective of the present invention is to provide a steerable and brakable sled which can be easily and conveniently used and controlled by a physically impaired person.

Another objective of the present invention is to provide a steerable and brakable sled which can be maneuvered by the user more easily and selectively than any other sled.

Also, another objective of the present invention is to provide a steerable and brakable sled which the user can turn the sled in either direction by simply turning the steering member which urges the skis to pivot on their edges.

Yet, another objective of the present invention is to provide a steerable and brakable sled which brakes much more quickly than any of the other sleds.

Further objectives and advantages of the present invention will become apparent as the description proceeds when taken in conjunction with the accompanying drawings wherein:

DETAILED DESCRIPTION OF THE INVENTION

Figure 1:
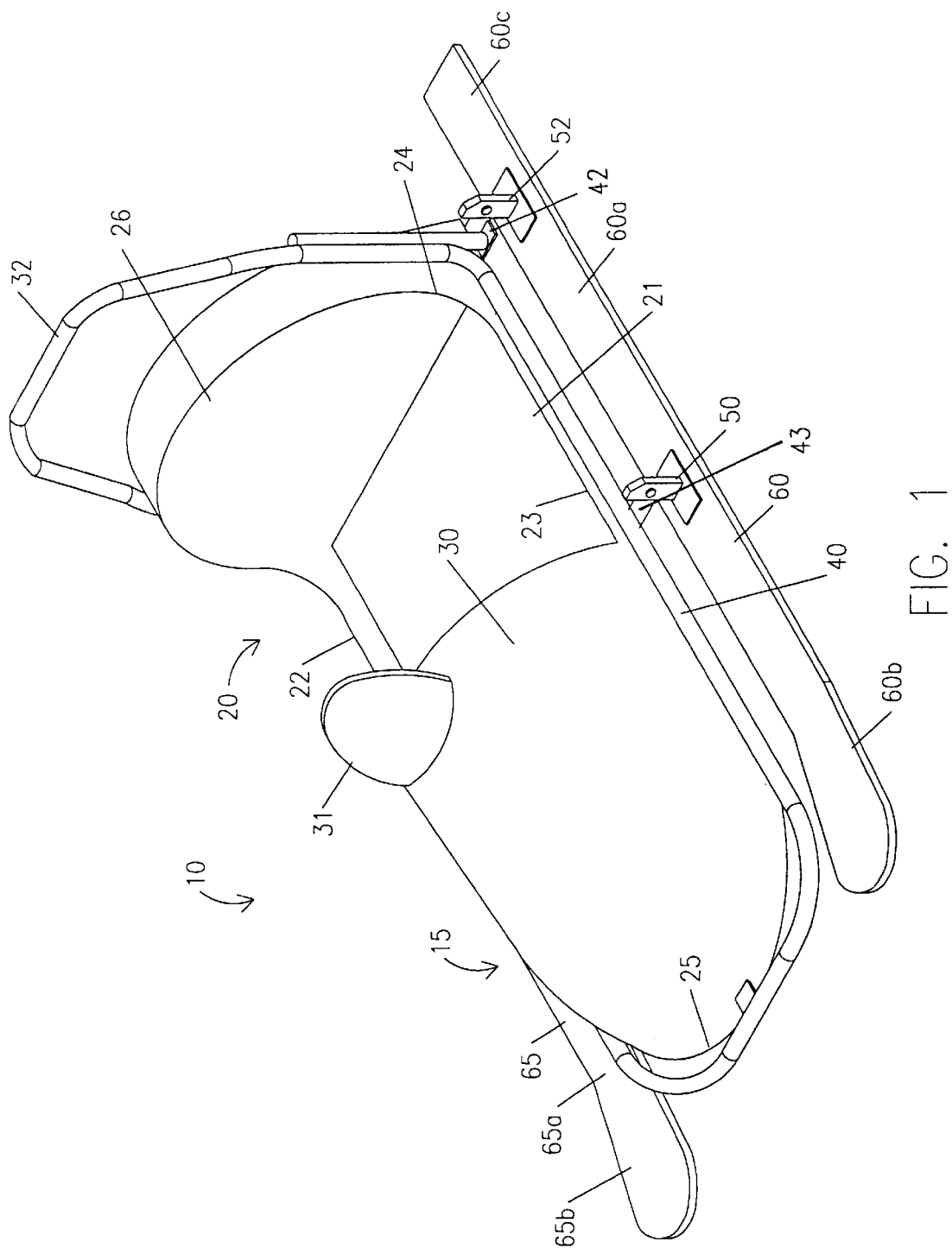
FIG. 1 is a perspective view of the steerable and brakable sled.
Figure 2:
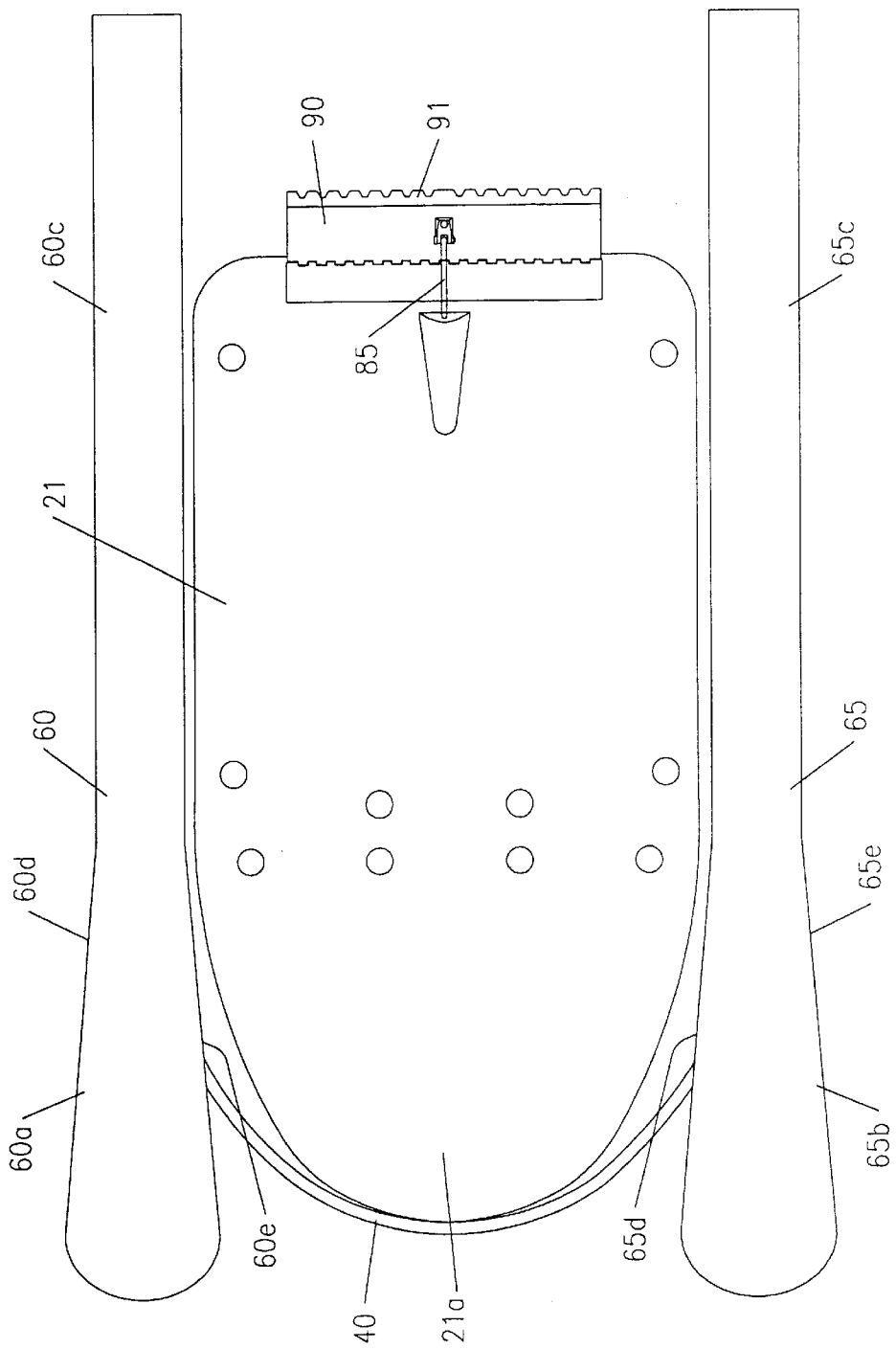
FIG. 2 is bottom planar view of the steerable and brakable sled showing in particular the braking means.
Figure 3:
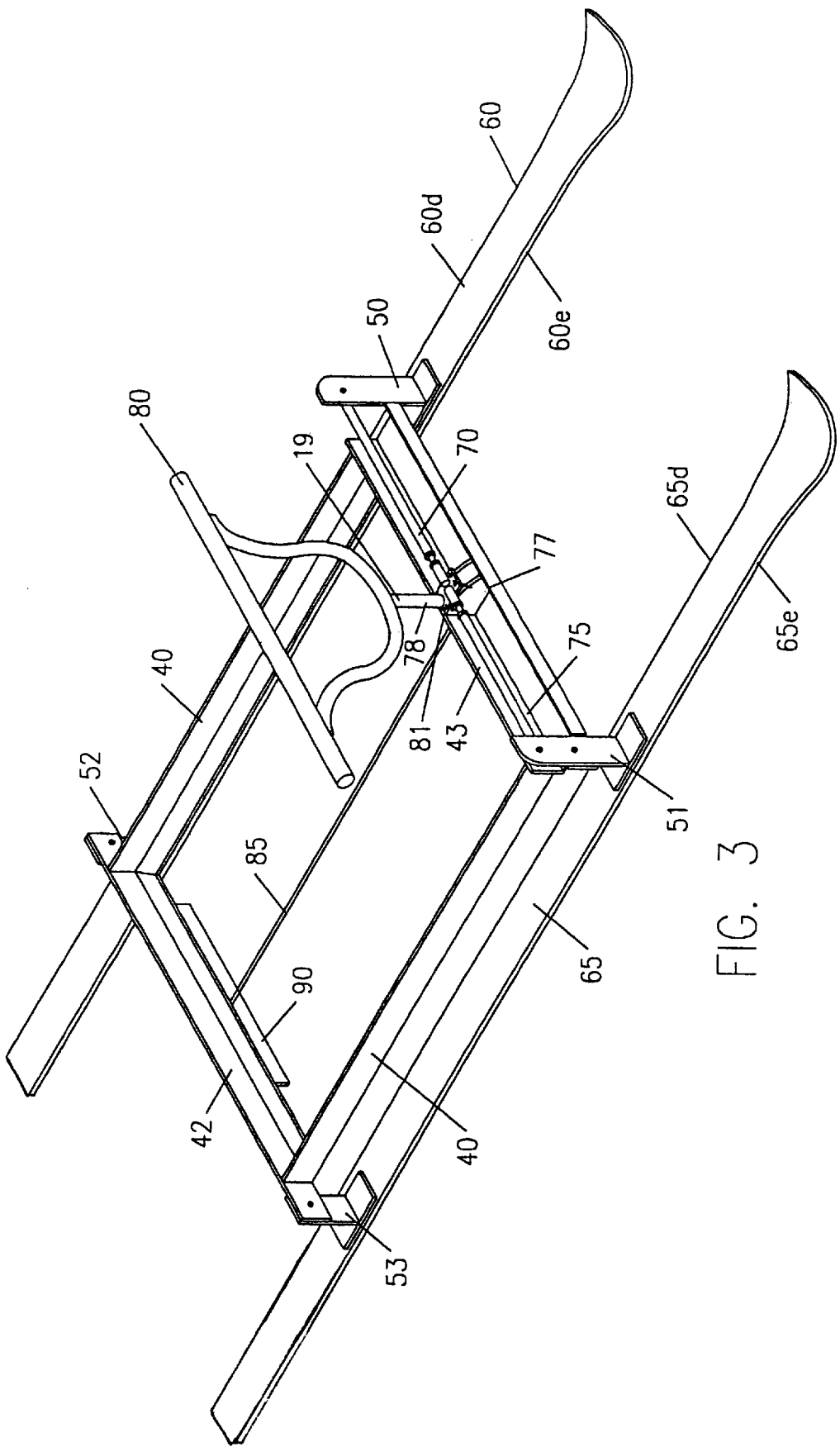
FIG. 3 is a detail view of the steering mechanism of the steerable and brakable sled.
Figure 4:
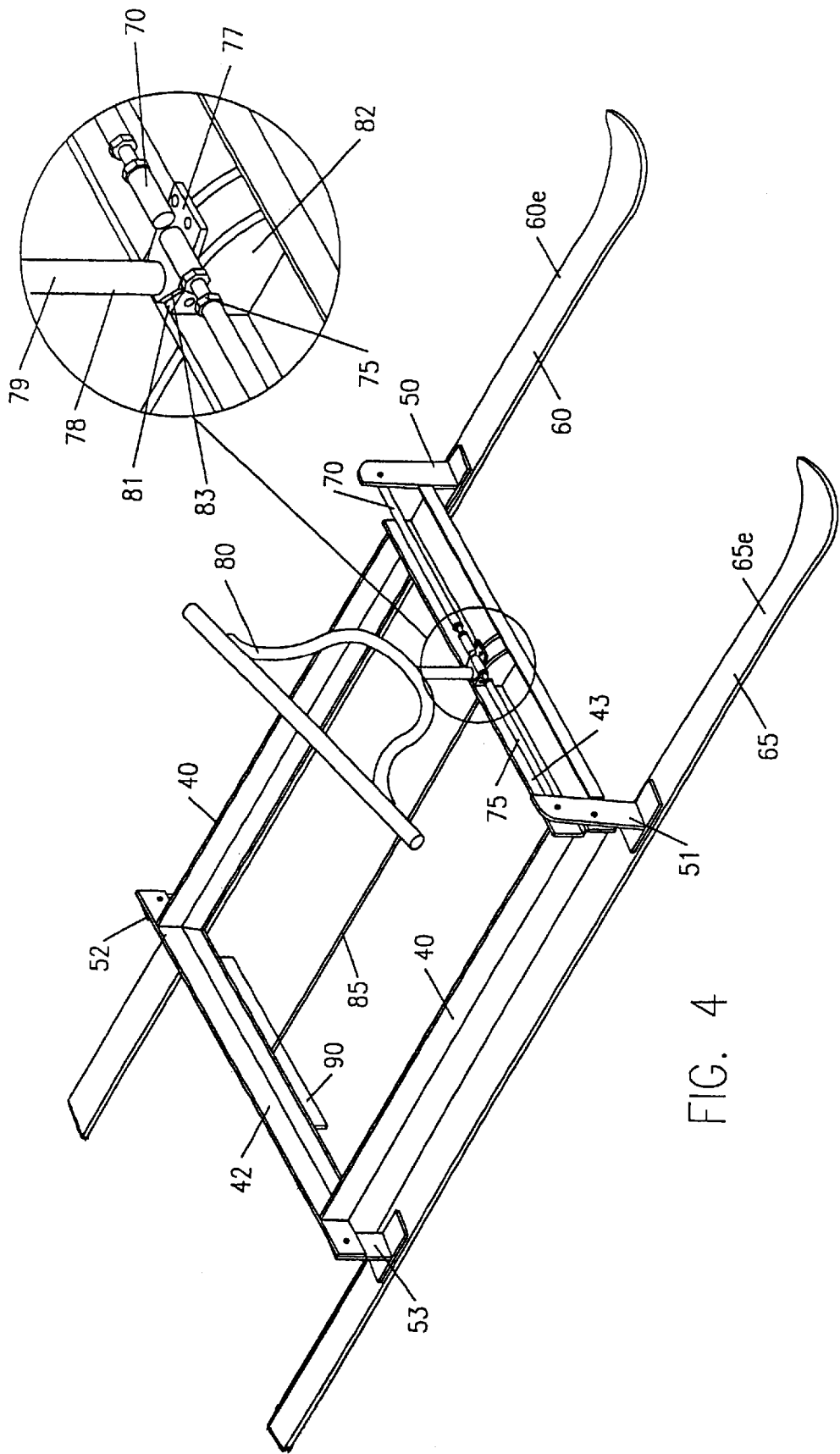
FIG. 4 is a detail view of the steering mechanism of the steerable and brakable sled with the skis pivoted on their edges for turning the sled in the desired direction.
Figure 5:
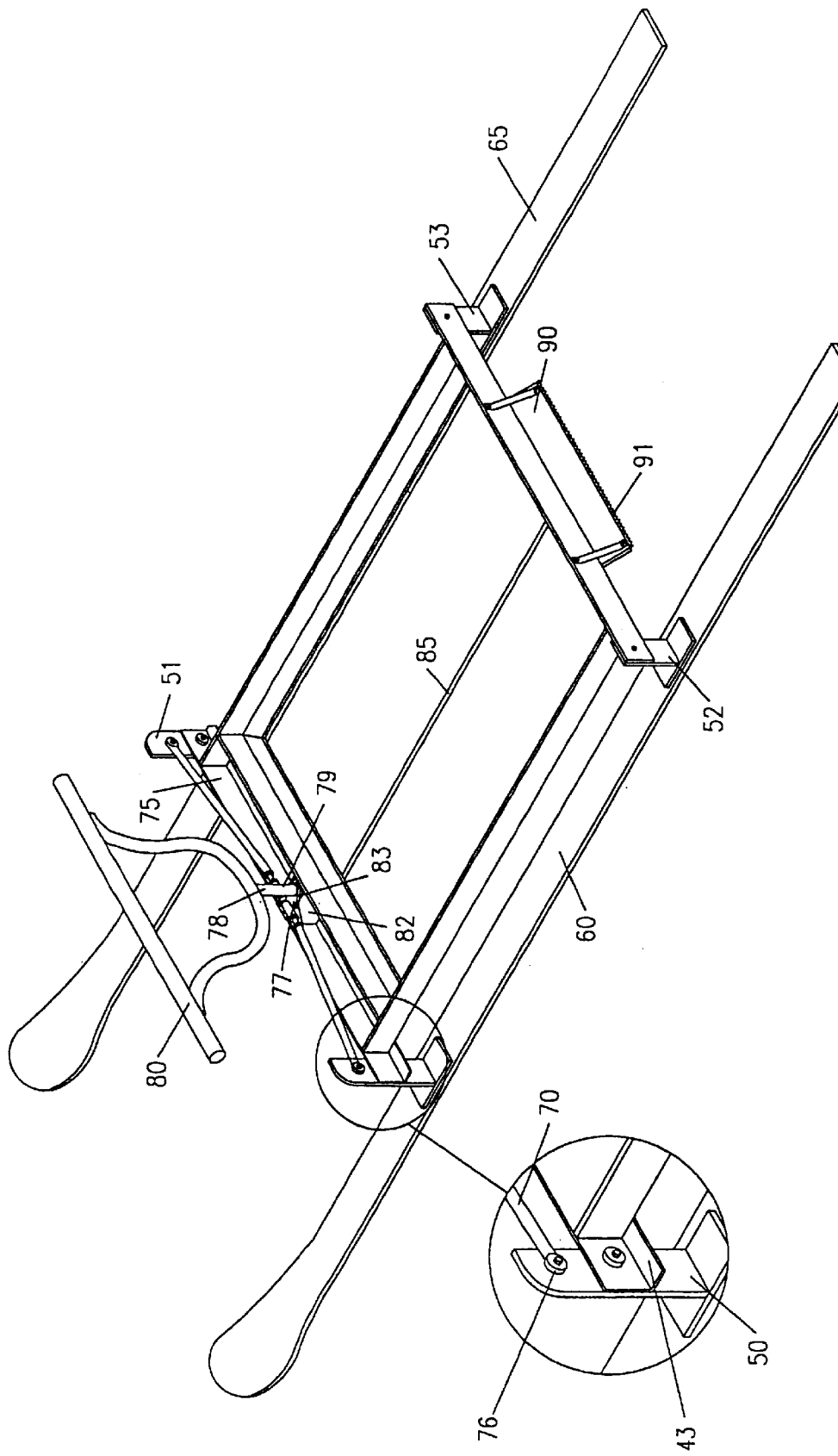
FIG. 5 is a detail view of the braking mechanism of the steerable and brakable sled.

Referring to the drawings in FIGS. 1–5, in particular, the steerable and brakable sled 10 comprises a body member 15 having a passenger compartment 20 including a floor member 21 having upturned right and left sides 22, 23 and upturned back and front ends 24, 25, a backrest member 26 fixedly attached upon the upturned back end 24 of the sled 10, a hood member 30 removeably mounted and attached to the edges of the upturned sides 22, 23 and front end 25 of the floor member 21 and having a windshield 31 fixedly attached upon the top of the hood member 30, all the body members 15 being preferably made of fiberglass, and a padded roll bar 32 extending upwardly from the backrest member 26. The body member 15 is fixedly mounted to a frame 40 which, in essence, is disposed on the top side of the floor member 21 and near the rear end 24 of the body member 15 and has a pair of cross members 42, 43 which extend through the upturned sides 24, 25 of the floor member 21, one of the cross members 42 traversing along the back edge of the floor member 21 and the other cross member 43 traversing a middle portion of the floor member 21. Four brackets, two front brackets 50, 51 and two rear brackets 52, 53, are securely and pivotally attached with bolts to the ends of the cross members 42, 43 which extend through the upturned sides 24, 25 of the floor member 21. The four brackets 50–53 are securely attached with bolts to the top sides 60a, 65a of a pair of skis 60, 65 which each has a forward duckbill-shaped portion 60b, 65b with the forward portion 60b, 65b having an upward curvature relative to the rearward portion 60c, 65c. A pair of steering arms 70, 75 each having a grommet (not shown) threaded in an end thereof are fastened with bolts to the two front brackets 50, 51. The other ends of the steering arms 70, 75 are securely attached to a steering bracket 77 which is fixedly attached or welded at an end thereof to a stub shaft 78 of the steering member 79 which is centrally disposed upon the floor member 21 and which includes handle means 80 mounted upon the stub shaft 78 which is journaled through a planar support member 81 which is rotatably attached to a pair of steering member mounting brackets 82, 83 fixedly attached to the frame 40, the support member 81 being adapted to rotate toward the rear of the sled 10 and back again about a horizontal axis. A braking arm 85 extends rearwardly from and is attached to the planar support member 81, and extends through the floor member 21 and is connected with a bolt to an elongate, rectangular planar braking member 90 which is hingedly attached to the bottom side 21a of the floor member 21 at the rear end thereof and which has a toothed or corrugated edge 91 which is adapted to engage the ground upon which the sled 10 moves to slow and stop the movement of the sled 10. The corrugated edge 91 of the braking member 85 is disposed perpendicular to the direction of movement of the sled 10.

To steer and guide the sled 10 as it moves, the user who is comfortably and securely seated in the passenger compartment 20 with shoulder straps and with his/her legs straddling the steering member 79 which includes the vertically-disposed handle means 80 mounted upon the stub shaft 78, turns or rotates the handle means 80 in essentially a horizontal plane and on the vertical axis of the shaft and in the direction of the desired turn which urges the steering arms 70, 75 horizontally inward or outward relative to the steering member 79, thus rotating the skis 60, 65 onto their side edges 60d, 60e, 65d, 65e and turning the sled 10 in the direction of the curvature of the forward portion 60b, 65b of the skis 60.65. If the user rotates the handle means 80 counterclockwise as viewed vertically above the steering member 79, the steering arm 75 connected to the left ski 60 is urged outward away from the steering member 79 causing the ski 60 to rotate upon its left edge 60d, and the steering arm 70 connected to the right ski 65 is urged inward toward the steering member 79 causing the right ski 65 to rotate upon its left edge 65d with the curvature of the forward portions 60b, 65b of the skis 60, 65 being to the left, thus causing the sled 10 to turn to the left. If the users rotates the handle means 80 clockwise as viewed vertically above the steering member 79, the right steering arm 70 is urged outward away from the steering member 79 and the left steering arm 75 is urged inward toward the steering member 79, causing the left and right skis 60, 65 to rotate onto their right edges 60e, 65e, thus causing the sled 10 to turn to the right because of the curvatures of the forward portions 60b, 65b of the skis 60, 65. By turning on the edges 60d, 60e, 65d, 65e of the skis 60, 65 rather than on the flat bottom sides of the skis 60, 65, the sled 10 is much more manageable and maneuverable than any of the conventional sleds.

To brake and stop the sled 10, the user urges the handle means 80 toward himself/herself or toward the rear of the sled 10, which urges the braking arm 85 forward or toward the steering member 79, thus causing the braking member 90 to rotate downward into a ground engagement position with the corrugated edge 91 engaging the ground and slowing or stopping the sled 10. The corrugated edge 91 of the braking member 90 extends along the entire length of the braking member 90 and as a result brakes this sled much more effectively than any of the braking means in other conventional sleds. To release the brake, the user urges the handle means 80 away from himself/herself and toward the front of the sled 10 which rotates the corrugated edge 91 of the braking member 90 upward out of engagement with the ground and which allows the sled 10 to be moved. The steering and braking means in this invention makes the sled 10 much more controllable and manageable than any of the conventional sleds, and as a result, allows less fortunate people who are physically impaired to control and maneuver the sled themselves and to enjoy the use of the sled much like people who are not physically impaired.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A steerable and brakable sled comprising:
   a body member having a passenger compartment and also including a floor member having upturned sides;
   a frame to which said body member is securely attached, said frame including cross members having ends, said frame further including a plurality of brackets pivotally attached to said ends of said cross members;
   a pair of skis each having an arcuate forward portion, said skis being pivotally attached to said frame and to either side of said body member, said skis having edges and being fixedly attached to said plurality of brackets for pivoting therewith and being adapted to be pivoted upon said edges thereof, each of said skis having an upwardly arcuate forward portion relative to a rearward portion of said ski;
   a steering means for pivoting said skis on edges thereof and for turning said sled, said steering means including a steering member and a pair of steering arms each of which is pivotally connected to a respective said bracket for pivoting said skis on said edges thereof to turn said sled in a desired direction, said steering member further including a steering member mounting bracket securely disposed upon said floor member, a support member being rotatably attached to said steering member mounting bracket and being rotatable about a horizontal axis, a shaft journaled in said support member and being rotatable about a vertical axis, and a handle means mounted upon said shaft; and
   a braking means for slowing and stopping said sled.

2. A steerable and brakable sled as described in claim 1, wherein said steering arms are attached to a steering bracket which is fixedly attached to said shaft for rotation therewith.

3. A steerable and brakable sled as described in claim 1, wherein said braking means comprises a braking arm attached to said support member and extending rearwardly of said sled and through said floor member and comprises a braking member which is connected to said braking arm and which is hingedly attached to a bottom side of said floor member near the rear end of said sled.

4. A steerable and brakable sled as described in claim 3, wherein said braking member has a corrugated edge along the length thereof for engaging the ground to slow and stop said sled.

5. A steerable and brakable sled as described in claim 4, wherein said corrugated edge of said braking member is disposed perpendicular to the direction of movement of said sled.

* * * * *